United States Patent
Bolikowski et al.

(10) Patent No.: US 12,045,218 B2
(45) Date of Patent: Jul. 23, 2024

(54) CONTEXTUAL GEOANALYTICS ENGINE IN A DATA ANALYTICS SYSTEM

(71) Applicant: The Boston Consulting Group, Inc., Boston, MA (US)

(72) Inventors: Lukasz Jerzy Bolikowski, Warsaw (PL); Aaron Dean Arnoldsen, Beaverton, OR (US); Julien Fissette, Paris (FR)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/883,359

(22) Filed: Aug. 8, 2022

(65) Prior Publication Data
US 2023/0049969 A1 Feb. 16, 2023

Related U.S. Application Data

(60) Provisional application No. 63/232,859, filed on Aug. 13, 2021.

(51) Int. Cl.
*G06F 16/22* (2019.01)
*G06F 16/25* (2019.01)

(52) U.S. Cl.
CPC ........ *G06F 16/2228* (2019.01); *G06F 16/254* (2019.01)

(58) Field of Classification Search
CPC .......................... G06F 16/2228; G06F 16/254
USPC ......................................................... 707/741
See application file for complete search history.

(56) References Cited

U.S. PATENT DOCUMENTS

| | | | | |
|---|---|---|---|---|
| 9,430,858 | B1* | 8/2016 | Har | G06T 11/206 |
| 10,783,450 | B2* | 9/2020 | Vlassis | G06N 20/00 |
| 2016/0321308 | A1* | 11/2016 | Brinnand | G06F 16/215 |
| 2018/0182041 | A1* | 6/2018 | Sheridan | G06F 16/29 |
| 2018/0301031 | A1* | 10/2018 | Naamani | G08G 1/148 |
| 2020/0005523 | A1* | 1/2020 | Brebner | H04B 17/318 |
| 2020/0159438 | A1* | 5/2020 | Meredith | G06F 3/0689 |
| 2020/0285788 | A1* | 9/2020 | Brebner | G06F 18/251 |
| 2021/0142187 | A1* | 5/2021 | Zilberman | G06Q 50/01 |
| 2021/0182320 | A1* | 6/2021 | Jin | G06F 16/24573 |

(Continued)

*Primary Examiner* — Hosain T Alam
*Assistant Examiner* — Nicholas E Allen
(74) *Attorney, Agent, or Firm* — Fish & Richardson P.C.

(57) ABSTRACT

Methods, systems, and computer storage media for providing a unified multilayer-based index for a contextual geoanalytics engine in a data analytics system. The contextual geoanalytics engine is configured to aggregate point-of-interest geographical data from multiple data sources into an aggregate or composite dataset. The contextual geoanalytics engine then transforms and maps the data into a homogenous dataset—i.e., a location embedding record that is homogenous representation of an aggregated dataset—comparable across global geographical regions. The homogenous dataset is accessible via the unified multilayer-based index that is a single geographical index, where the homogenous dataset is a composite of different datasets. The data includes different data types, where the data types are stored in different layers while sharing a common index (i.e., unified multilayer-based index). In this way, the unified multilayer-based index is a shared common index with a plurality of different layers associated with data used in geographically-based analytics.

18 Claims, 10 Drawing Sheets

(56) References Cited

U.S. PATENT DOCUMENTS

| | | | |
|---|---|---|---|
| 2021/0200218 A1* | 7/2021 | Albrecht | G06V 10/25 |
| 2021/0216928 A1* | 7/2021 | O'Toole | G06F 16/287 |
| 2023/0052612 A1 | 2/2023 | Stoehr et al. | |

* cited by examiner

CONTEXTUAL GEOANALYTICS ENGINE IN A DATA ANALYTICS SYSTEM

CROSS-REFERENCE SECTION

The present application claims the benefit of U.S. Provisional Application No. 63/232,859, filed Aug. 13, 2021 and entitled "Contextual Geoanalytics Engine In A Data Analytics System", the entirety of which is incorporated by reference herein.

BACKGROUND

Many companies rely on data analytics systems for computational analysis of data or statistics to discover, interpret, and communicate important patterns in data. Data analytics systems implement predictive analysis (e.g., a forecasting system) and machine learning that analyze current and historical facts to make predictions about future events. For example, a business predictive model may analyze historical and transactional data to identify risks and opportunities. A data analytics system can operate based different types of datasets to facilitate training machine learning models and performing predictive analysis. For example, a dataset can be used in a customer relationship management application, where the dataset includes customers, accounts, and transactions. Datasets can be internal datasets (e.g., specific to a particular organization) and datasets can also be external datasets that provide additional contextual information that supplement internal datasets.

Conventionally, data analytics systems are not configured with a computing infrastructure and logic to intelligently aggregate datasets and provide the datasets at varying levels of granularity via a unified platform. In particular, conventional data analytics systems and corresponding operations rely on disjointed datasets that are not harmonized, resulting in low quality independent datasets and cumbersome tools for managing and using the datasets. For example, if a first dataset has geographical data represented using zip codes and a second dataset has geographical data represented using longitudes and latitudes, conventional data analytics system require multiple steps and interfaces for accessing and using the datasets. As such, a more comprehensive data analytics systems—having an alternative basis for providing data analytics systems operations—can improve computing operations and interfaces in data analytics systems.

SUMMARY

Various aspects of the technology described herein are generally directed to systems, methods, and computer storage media, for among other things, providing a unified multilayer-based index for a contextual geoanalytics engine in a data analytics system. The contextual geoanalytics engine ("analytics engine") is configured to aggregate geographical data from multiple data sources into an aggregate or composite dataset. The analytics engine transforms the data into a homogenous dataset (e.g., location embedding records) that is comparable across global geographical regions. The homogenous dataset is accessible via the unified multilayer-based index that is a single geographical index, where the homogenous dataset is a composite of different datasets. The data includes different data types, where the data types are stored in different layers while sharing a common index (i.e., unified multilayer-based index).

In this way, the unified multilayer-based index is a shared common index with a plurality of different layers associated with data used in geographically-based analytics. For example, different data types (e.g., harmonized point-of-interest information) can be stored and accessed using location embedding records and the shared common index. Operationally, the contextual geoanalytics engine supports aggregating statistics at a hierarchical and low-level of granularity, merging datasets, and using machine learning to generate location embedding records. The multilayer processing system further includes a multilayer processing engine Application Programming Interface (API) that exposes the data via the unified multilayer-based index.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
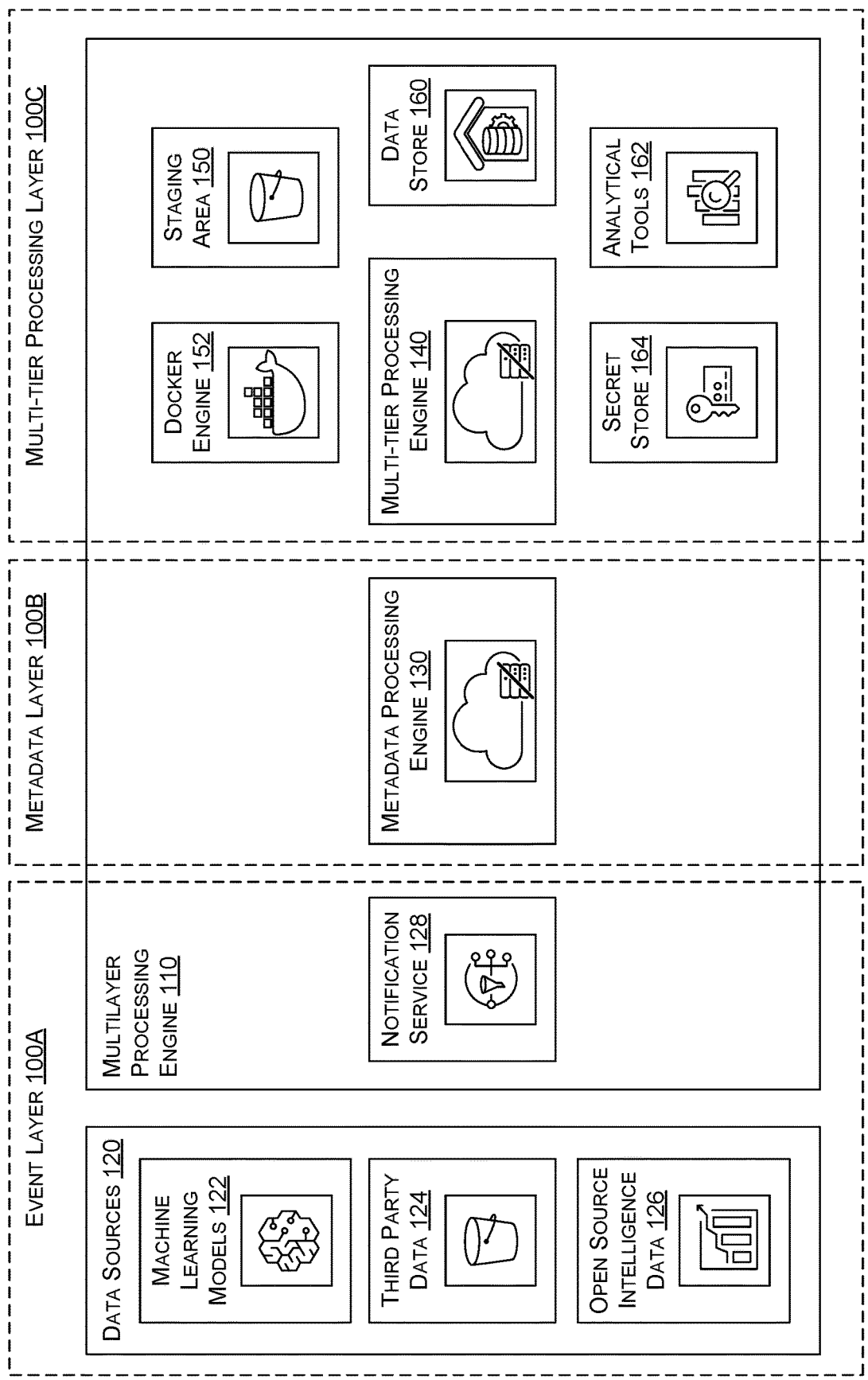
FIGS. 1A and 1B are block diagrams of an exemplary data analytics system with a multilayer processing engine, in which embodiments described herein may be employed.

By way of background, a data analytics system can support performing computational analysis of data or statistics to discover, interpret, and communicate important patterns in data. Many companies (e.g., retail, manufacturing, travel, construction) implement data analytics systems to gather, monitor, track, model, and deploy data-driven insights to create competitive advantages. Data analytics can include business analytics that include iterative explorations and investigations of past business performance to gain insights and drive business planning. In particular, business analytics can include demand forecasting, pricing, assortment optimization, and point-of-sale locations using different types of computing systems and platforms. For example, demand forecasting includes the use of historical sales data to develop an estimate of an expected forecast of customer demand.

Forecasting models can be created using machine learning methods to increase forecast accuracy; however, it is essential to have reliable intelligent data. Business analytics data includes internal datasets—such as organization-specific datasets—that include information about the organization. External datasets can be contextual datasets that provide additional relevant data facts that supplement internal datasets. Contextual data can improve business analytics processes in that contextual data incorporates information from outside of the organization.

High-grade datasets can be difficult to find to adequately support data analytics systems. High grade datasets can refer to a quantified measure of quality for types of attributes (e.g., completeness, harmonization, arbitrary-precision, structure, representation of geo-analytical context of a location). Business analytics can include predictive analytics for making inferences and predictions which are enhanced based on reliable intelligent data (i.e., high-grade data). For example, predictive analytics associated with geographical locations can impact predicted outcomes based on variables of interest of the geographical locations. Possessing extensive and harmonized geographical data that cover geographies of interest—at a geographically-based level of granularity—can improve data mining, predictive modelling, and machine learning that analyze current and historical facts to make predictions about future or otherwise unknown events.

Low-grade datasets can present challenges in data analytics systems. In particular, low-grade datasets are associated with duplicates, incomplete data, or inconsistent formats. For example, multiple copies of the same record are stored across multiple data sources. Not only does this take a toll on computation and storage, it also produces inaccurate insights for business intelligence purposes. Conventional data analytics rely on a combination of different tools to address each of the above-referenced issues in datasets. For example, a data deduplication software can use a combination of algorithms, human insight and machine learning to identify duplicates and help remove redundant data. Other independent tools can be used to handle incomplete data and inconsistent formats.

Conventionally, data analytics systems are not configured with a computing infrastructure and logic to intelligently aggregate datasets and provide the datasets at varying levels of granularity via a unified platform. In particular, conventional data analytics systems and corresponding operations rely on disjointed datasets that are not harmonized, resulting in low quality independent datasets and cumbersome tools for managing and using the datasets. For example, if a first dataset has geographical data represented using zip codes and a second dataset has geographical data represented using longitudes and latitudes, conventional data analytics system require multiple steps and interfaces for accessing and using the datasets. As such, a more comprehensive data analytics systems—having an alternative basis for providing disparate datasets for data analytics systems operations—can improve computing operations and interfaces in data analytics systems.

Embodiments of the present disclosure are directed to providing a unified multilayer-based index for a contextual geoanalytics engine in a data analytics system. The contextual geoanalytics engine ("analytics engine") is configured to aggregate data (e.g., data associated with geographical regions) from multiple data sources into an aggregate or composite dataset. The analytics engine transforms the data into a homogenous dataset (e.g., location embedding records) that is comparable across global geographical regions. The homogenous dataset is accessible via the unified multilayer-based index that is a single geographical index, where the homogenous dataset is a composite of different datasets. The data includes different data types, where the data types are stored in different layers while sharing a common index (i.e., unified multilayer-based index). In this way, the unified multilayer-based index is a shared common index with a plurality of different layers associated with data used in geographically-based analytics. For example, different data types (e.g., harmonized point-of-interest information) can be stored and accessed using location embedding records and the shared common index.

Operationally, the contextual geoanalytics engine supports aggregating statistics at a hierarchical and low-level of granularity, merging datasets, and using machine learning to generate location embedding records. Mapping the location embedding records to a unified multilayer-based index. The multilayer processing system further includes a multilayer processing engine Application Programming Interface (API) that exposes the data via the unified multilayer-based index. For example, using the API, a query accessed and a location embedding record identified based on the query can be determined and communicated to a client device.

Figure 1B:
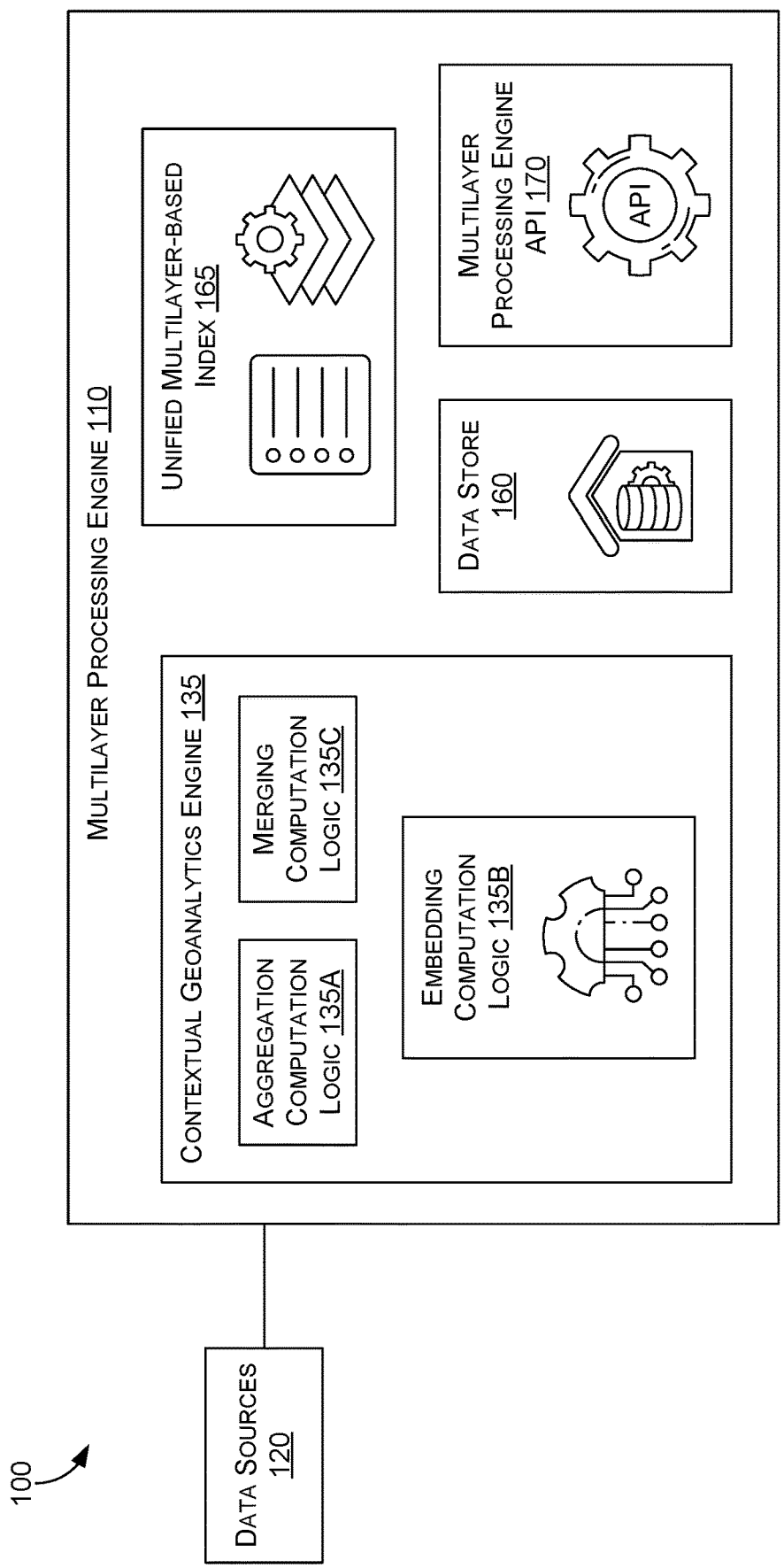
Figure 1C:
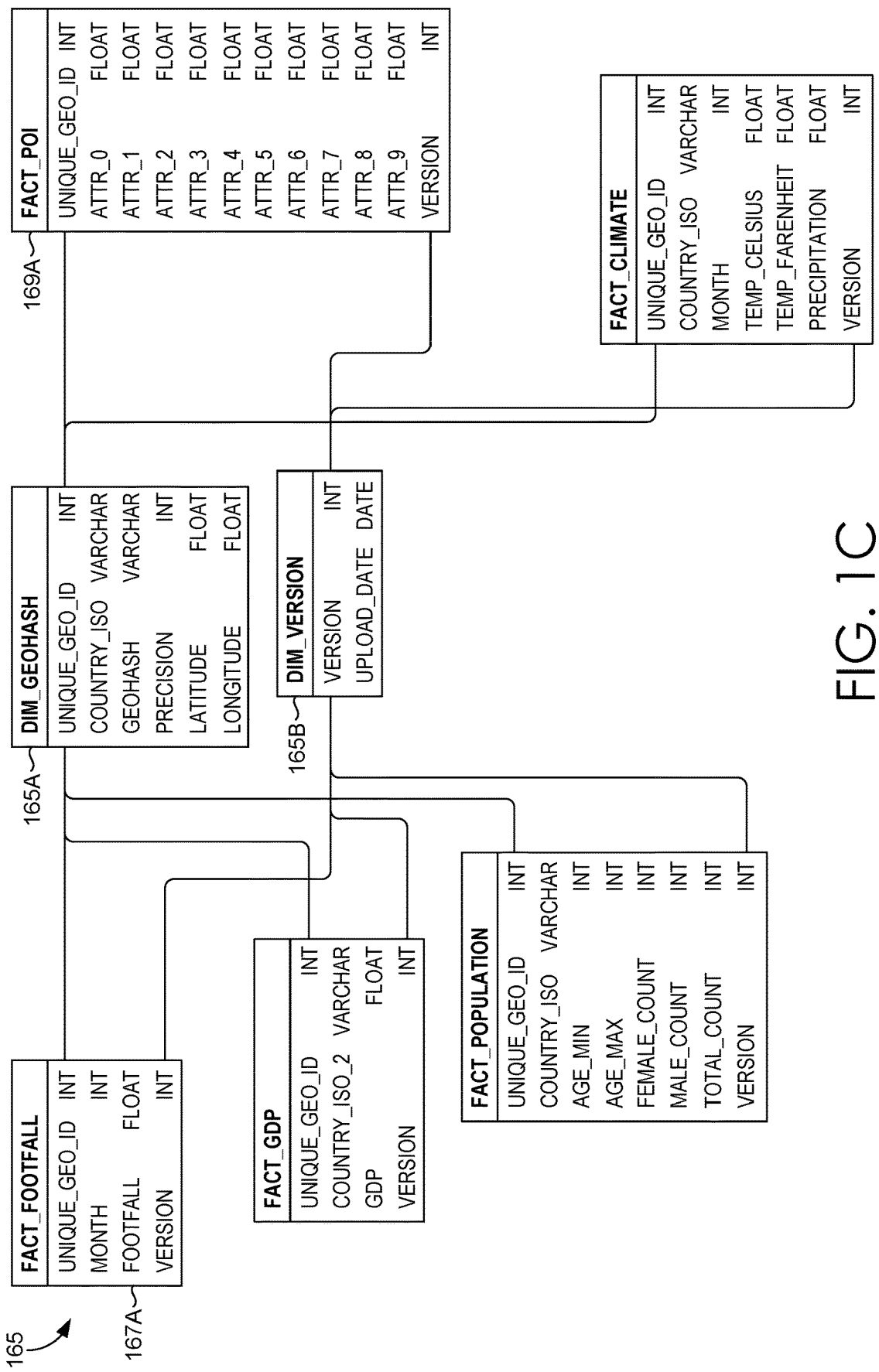
FIG. 1C is an exemplary schematic associated with a data analytics system with a multilayer processing engine, in which embodiments described herein may be employed.

Aspects of the technical solution can be described by way of examples and with reference to FIGS. 1A, 1B, and 1C. FIG. 1A illustrates a data analytics system 100—also referred to herein as the multilayer processing system— including an event layer 100A, metadata layer 100B, multi-tier processing layer 100C, and multilayer processing engine 110 (i.e., data analytics engine or serverless management engine). The event layer 100A includes data sources 120 including machine learning models 122, third party data 124, open source intelligence data 126, and notification service 128. The metadata layer 100B includes the metadata processing engine 130, and the multi-tier processing layer 100C includes multi-tier processing engine 140, staging area 150, docker engine 152, data store 160, analytical tools 162, and secret store 164.

At a high level, the multilayer processing engine 110 includes an extract, transform, and load engine (ETL engine—i.e., contextual geoanalytics engine 135), a unified multilayer-based index 165 associated with the data store 160, and a multilayer processing engine API 170. The contextual geoanalytics engine 135 ingests datasets acquired from different data sources 120. The contextual geoanalytics engine 135 operates to perform data cleaning that includes detecting and correcting (or removing) corrupt or inaccurate records from the dataset. The contextual geoanalytics engine further performs data harmonization on the data, specifically to align the data across global geographical regions.

The contextual geoanalytics engine 135 operates with the unified multilayer-based index 165 to aggregate data sources of different arbitrary precisions. The unified multilayer-based index 165 is a geohash index, where geohashing geographical regions helps to accelerate access to data (stored as data layers) with arbitrary levels of aggregation. As part of the ETL operations of the multilayer processing engine 110, diverse data layers are co-registered in association with the unified multilayer-based index.

The contextual geoanalytics engine 135 supports generating of location embedding records. A location embedding record refers to a homogenous representation of data in data layers. Location embedding records are calculated and created based on point-of-interest information—(e.g., restaurants, retail stores, and grocery stores)—stored as data layers. The point of interest can refer to a data set containing a geographical region identifier that represents important locations in a geographical region. These location embedding records include the point-of-interest information and are associated with the unified multilayer-based index in a hierarchal dimensional space. In particular, the location embedding records can be associated different dimensional space. For example, a location embedding record can be associated with a low-level dimensional space that is different from an original dimensional space associated with the point-of-interest information.

The data is stored in a database, where each data layer can be hosted on a different data table indexed by geohash. A multilayer processing engine API can support accessing the database and performing other types of functionality supported via the multilayer processing engine. As such, the contextual geoanalytics engine 135 is configured to aggregate geographical data from multiple data sources into an aggregate or composite dataset that is accessible via the unified multilayer-based index and the multilayer processing engine API.

The embodiments described herein can be provided via a multilayer processing engine 130 in data analytics system 100 (i.e., a multilayer processing system). The data analytics system 100 corresponds to the data analytics system 100 in U.S. application Ser. No. 17/845,851 entitled "MULTILAYER PROCESSING ENGINE IN A DATA ANALYTICS SYSTEM," which is incorporated herein in its entirety. The metadata layer 100B can refer to a functional component that interacts in a sequential hierarchy—relative to an event layer and a multi-tier processing layer 100C— to analyze incoming event streams and configure downstream processing. The metadata layer 100B provides for dynamic metadata configuration of data associated with the event layer 100A and the multi-tier processing layer 100C. The data analytics system—operating via a serverless distributed computing system. The data analytics system (i.e., a multilayer processing system) implements the multilayer processing engine 130 as a serverless data analytics management engine for processing high frequency data at scale. The multilayer processing engine 130 can dynamically scale the infrastructure to changing workloads—as workloads increase or decrease—by provisioning computing components on an as-needed basis. The multilayer processing engine 130 is implemented in a decoupled and cost-effective architecture. The multilayer processing engine 130 also supports ETL processes that can be extended rapidly and do not require maintenance tasks.

With reference to FIG. 1B, FIG. 1B illustrates aspects of the multilayer processing engine 110. FIG. 1B includes data sources 120, contextual geoanalytics engine 135—including aggregation computation logic 135A, embedding computation logic 135B, and merging computation logic; unified multilayer-based index 165, and multilayer processing engine Application Programming Interface (API) 170.

The contextual geoanalytics engine 135 aggregates geographical data from multiple sources and associates them with the unified multilayer-based index 165 is a geohash index. As such, the contextual geoanalytics engine 135 supports geohashing. Geohasing is a geocoding method used to encode geographic coordinates (e.g., latitude and longitudes) into a representation (e.g., strings of digits and letters) that delineate an area on a map. The area on the map can be referred to as a cell with varying levels of granularity. In one implementation, geohashing supports converting geographic information into an alphanumeric hash, so that the geohash is used to identify a rectangular area around a fixed point (e.g., point of interest—such as—businesses, restaurants, or parks). The length of the hash can be used to determine the precision of the area identified.

Geohashing can support executing a hierarchical search where the length of the geohash corresponds to the size of a search area. For example, the geohash may be associated with hierarchical cells (e.g., a first level cell, a second level cell, where the first level cell is smaller than the second level cell). Each hierarchical cell can be associated with a shape file that supports associating information with the hierarchical cell. A unique identifier identifies each cell via the geohash to accelerate access to the locations and corresponding data (e.g., location embedding record).

The multilayer processing engine 110 includes the unified multilayer-based index 135 that is a geohash index. The unified multilayer-based index can be a hierarchical data structure having cells that are linked to each other in a parent-child relationship in a tree structure. The hierarchical data structure can specifically be a hierarchical spatial data structure that distributes data conditioned on a spatial process or parameters, the spatial process is conditioned on parameters that define spatial dependencies between locations and parameters. For example, the conditioned data can be data layers and location embedding records, as described herein. The unified multilayer-based index supports aggregating data sources of different arbitrary precisions and in different formats.

The unified multilayer-based index 135 can specifically be associated with aggregated data from data sources 120, where the data is arranged by data type in data layers. The aggregation computation logic 135A provides instructions for how to harmonize and aggregate data from data sources 120. A data layer refers to a storage construct for storing different types of data. For example, data can be geographical data that identifies a particular geographical location (e.g., city, county, state, zip code or longitude and latitude). A data layer may also store different types of contextual information or metadata that can be mapped to a particular geographical location. Data layers may be conceptual layers—explicit or implicit—that provide different contextual data for different locations. As such, a first dataset may include a first type of data (e.g., indexed by county) that is stored in a first data layer. A second dataset may include three different types of data that are stored in three different data layers (e.g., e-commerce data, climate, GDP). Each dataset may have its corresponding index and the data layers may be associated with their own indexes as well.

The contextual geoanalytics engine 135 supports generating location embedding records. The embedding computation logic 135 provides instructions to generate location embedding records. Location embedding records are calculated and created based on point-of-interest information—(e.g., restaurants, retail stores, and grocery stores)—stored as data layers. The point-of-interest can refer information—associated with a geographical region identifier—that represents important locations in a geographical region. These location embedding records include the point-of-interest information and are associated with the unified multilayer-based index 135 in a hierarchal dimensional space. In particular, the location embedding records can be associated with a low-level dimensional space that is different from an original dimensional space associated with the point-of-interest information.

The data layers can be stored in different tables such that the unified multilayer-based index can be used to join the data layer tables. Conceptually merging the data can be based on a merging computation logic 135C. The data layers may be co-registered or merged into the unified multilayer-based index. The datasets that correspond to the data layers can be accessed using the unified multilayer-based index. In particular, multiple data layers can be queried simultaneously based on being co-registered to a geohash identifier associated with a location (i.e., cell or plurality of hierarchical cells) of the unified multilayer-based index. For example, a first data layer associated zip code data can be registered to a first cell and a second data layer associated longitude and latitude data can be registered to the same cell. In this way, the datasets are merged into the unified multilayer-based index. Operationally, the data tables can be associated with geocaches to efficiently zoom to specific locations.

The data as represented in data layers—including some data items that have been transformed—can be stored in a data store. The data store and data associated with the data layers are accessible via the multilayer processing engine API 170. The data store can specifically store data in dimension tables and fact tables. The tables can be indexed by unique geohash identifiers. Dimensions provide a structure that categorizes facts and measures in order to enable users to answer business questions. For example, a dimension table can include a collection of reference information about a measurable event. These events are known as facts and are stored in a fact table.

Different types of users (e.g., data scientists) may access the data via the multilayer processing engine API to retrieve datasets associated with different locations. For example, a user may query the unified multilayer-based index based on attributes associated with data tables to access the datasets stored in data layers. The datasets can be used, for example, to perform demand forecasting analysis for the locations. The multilayer processing engine API 170 can provide an interface that presents—interface elements—attributes of the unified multilayer-based index or location embedding records associated with locations. For example, data visualizations can be used to review location embedding records and access datasets that correspond to locations.

The contextual geoanalytics engine 135 transforms the data into a homogenous dataset (i.e., location embedding records) that is comparable across global geographical regions. In particular, location embedding records can be computed and mapped to the unified multilayer-based index. Location embedding records can include contextual information that give context to the location. Contextual information can include information that is associated with a particular geographical location via different types of datasets from different sources. Contextual information can also include aggregated statistics, e-commerce data, spend data, mobility data, climate data that can be associated with a particular location. Location embedding records can be associated with different levels of granularity relative to how representative the data is of the level of granularity. As such, queries can be made at different levels of granularity and corresponding location embedding records can be generated and communicated for the level of granularity.

Advantageously, the locations embedding records can reduce dimensions in data associated with the different data layers. For example, a particular location may be associated with 10 data sources and 50 data layers and 50 dimensions. The location embedding record may summarize the dimensions to the most relevant dimensions and provide only a subset of dimensions—via the location embedding record—via the unified multilayer-based index. In this way, the location embedding records identify key properties that are relevant to a particular location.

The location embedding records can be generated based on a machine learning model; in this way, additional and hidden layers of information can be identified for the location embedding records. The machine learning model can be trained based on deep learning machine learning techniques and neural networks. The machine learning model is trained on different datasets, explicit and implicit relationships, and the data structure of the unified multilayer-based index. The machine learning model facilitates automatically identifying contextual information that can be incorporated into a location embedding record and mapped to unified multilayer-based index. In particular, the machine learning model can be trained in part on the vector representation of data and identified machine learning attributes associated with a particular location, where vector representations are associated with different points-of-interests and locations (e.g., retail store in the suburbs or museum in a metropolitan area). The machine learning model, during training, can include weighting certain more relevant attributes associated with the location embedding records in order to effectively train the machine learning model.

The machine learning model may be configured to support identifying contextual information that is incorporated into a location embedding record to be mapped at different levels of granularity or hierarchical levels associated with unified multilayer-based index. For example, retail data in a location embedding record for Paris may correlate highly with retail data for New York City, as such, certain inferences and predictions can be made on how to improve the generation of location embedding records for both regions.

Moreover, the machine learning model can be trained to use data of the location embedding records associated with a first location (e.g., Europe) to make predictions on what types of locations embedding records should be associated with a second location (e.g., Asia). For example, based on a dataset that has an explicit association of a data type (with a set attributes) to a location (with a set attributes) the machine learning model, such that, location embedding records are generated with the data type (or other co-occurring relationships) for the location, the machine learning model can be trained to identify locations that should have similar data types for their location embedding records—even though such explicit associations do not exist.

The machine learning model can further be trained to map the location embedding records to an appropriate level of granularity. The machine learning model can also be trained to find similarities and differences or correlations and the lack thereof between locations. The machine learning model can be used to test and validate different types of location embedding records across different locations. As such, the machine learning model can learn from different types of data layers, location embedding records, levels of granularity, locations and their corresponding attributes to make inferences and predictions on how to construct additional location embedding records.

With reference to FIG. 1C, FIG. 1C illustrates aspects—schema representations—of the unified multilayer-based index 165. FIG. 1C includes of the unified multilayer-based index 165 including a first dimension table 165A and a second dimension table 165B and a fact table 167A and a second fact table 169A. The first dimension table 165A illustrates a geohash that includes a unique_geo_id and a geohash. The first dimension table 165A can further include a country_iso (country code) and longitude and latitude associated a geographic region. The first dimension table 165 can also include a precision quantifier that identifies a level of precision. The fact tables can be associated with different types of facts. For example, facts about football—FACT_FOOTFALL fact table 167A—or facts about a point of interest—FACT_POI fact table 169A.

Figure 2A:
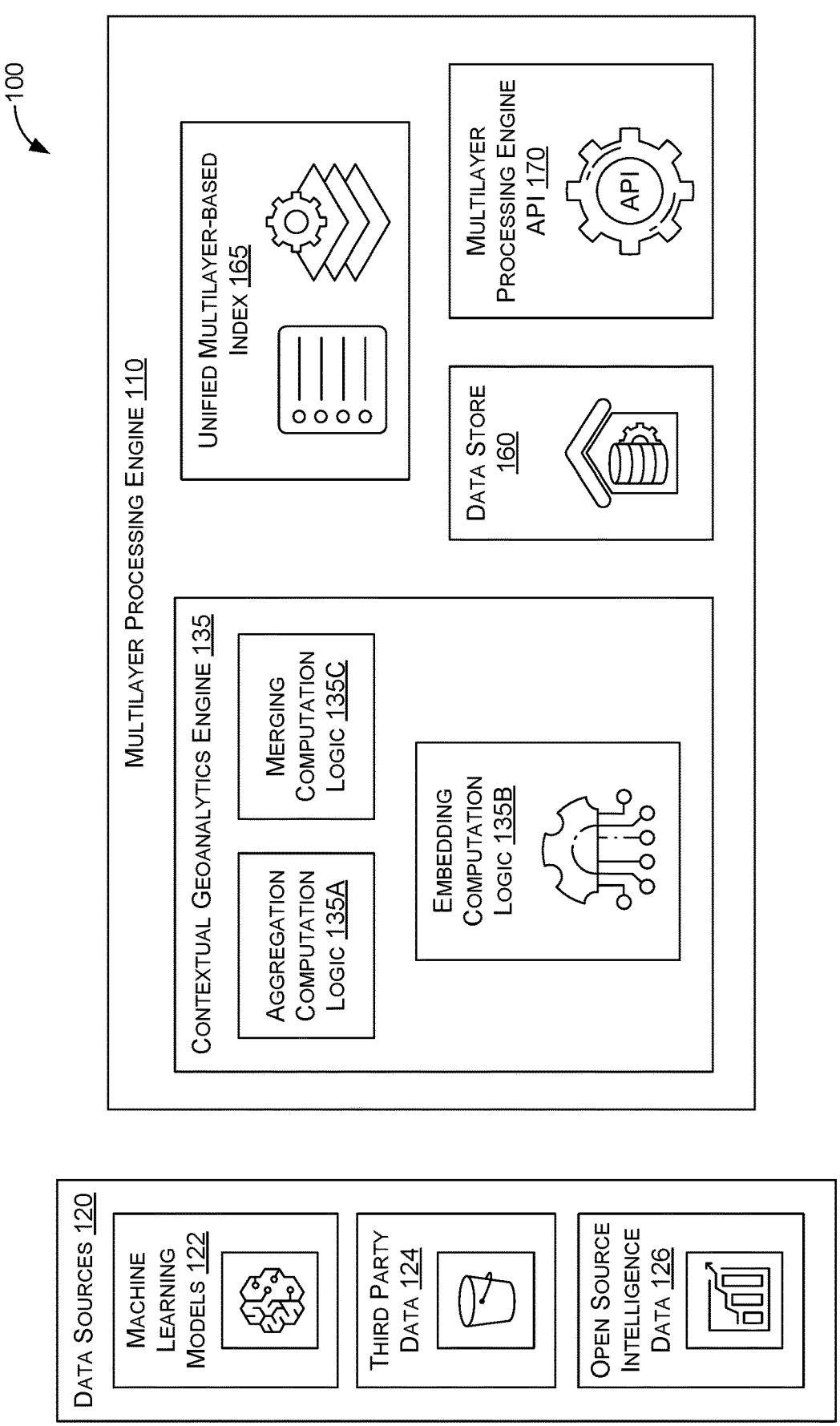
FIGS. 2A and 2B are block diagrams of an exemplary data analytics system with a multilayer processing engine, in which embodiments described herein may be employed.
Figure 2B:
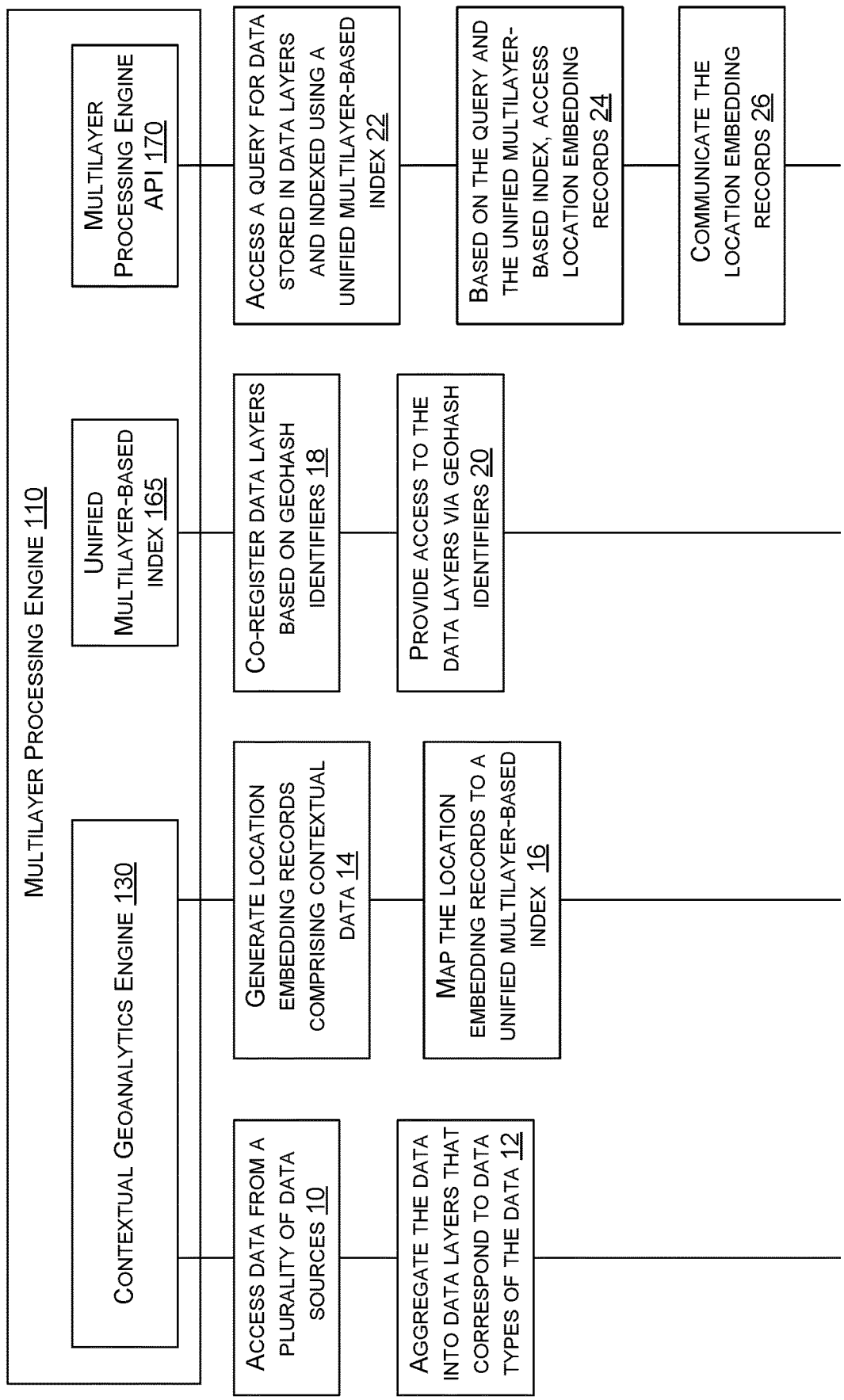

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example data analytics system 100 in which methods of the present disclosure may be employed. In particular, FIG. 2A shows a high level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including data sources 120, contextual geoanalytics engine 135—including aggregation computation logic 135A, embedding computation logic 135B, and merging computation logic; unified multilayer-based index 165, and multilayer processing engine Application Programming Interface (API) 170.

The multilayer processing engine 110 supports providing a unified multilayer-based index for a contextual geoanalytics engine in a data analytics system. At high level, the contextual geoanalytics engine 135 supports each of the following: export, transport, and load (ETL) operations for aggregating statistics as hierarchical and granular data; merging datasets based on the data layers and the unified multilayer-based index 165 operating as a shared common index for the data layers; employing a machine learning model to generate the location embedding records, and providing an Application Programming Interface (API) that exposes the unified multilayer-based index 165.

The contextual geoanalytics engine 135 accesses data source 120 and aggregates—using aggregation computation instructions 135A—data into data layers. The data layers correspond to data types of the data. The data layers are stored in data store 160. Each data layer may be stored in a data table that is associated corresponding location embedding records, where each data layer is indexed by a geohash identifier or a shared geohash identifier.

Using embedding computation logic 135A, the contextual geoanalytics engine 135 generates location embedding records. The location embedding records are a homogenous representation of the data. The data can be associated with a geographical region and contextual data of the geographical region. The location embedding record is generated based on point-of-interest data of the data. A location embedding record may be associated with two or more data types. In addition, a first location embedding record represents a data entry of the data in a smaller dimensional space represented by a smaller cell of geographical region, where the data entry was originally associated with a larger dimensional space represented by a larger cell of the geographical region. Moreover, using the machine learning model of the embedding computation logic 135B and context information associated with a second location, a predicted context data to can be identified and associated with the second location, such that, a second plurality of location embedding records for the second location are identified.

Using merging computation instructions 135C, the contextual geoanalytics engine 135C maps the location embedding records to a unified multilayer-based index 165. In particular, the contextual geoanalytics engine 135C can support co-registering data layers to a shared geohash identifier, where the co-registered data layers represent the data in different data types and the data layers are queried simultaneously based on the shared geohash identifier.

The unified multilayer-based index 165 provides access to the location embedding records associated with the data types of the data that are stored in different data layers. The unified multilayer-based index 165 is a hierarchical spatial data structure associated with data may have arbitrary precisions for corresponding geographical regions. A first data entry of a first data layer is associated with a first precision and a second data layer is associated with a second precision. The first data entry and the second data entry are associated with a point-of-interest of the location embedding record, the first data entry and the second data entry are accessible via different data layers associated with the location embedding records.

The multilayer processing engine API 170 exposes the unified multilayer-based index 165 such that queries can be issued and executed against the multilayer-based index 165. For example, the multilayer processing engine 110 accesses a query for requested data stored in data layers and indexed using the unified multilayer-based index 165. Based on the query and the unified multilayer-based index 165, a location embedding record associated with the requested data or that satisfies the query can be accessed or identified. The location embedding record is communicated. Communicating the data further comprises causing display of the data in a data visualization comprising a plurality unified multilayer-based index interface elements that support reviewing location embedding records and accessing datasets that correspond to points-of-interest.

With reference to FIG. 2B, FIG. 2B illustrates contextual geoanalytics engine 130, unified multilayer-based index 165, and multilayer processing engine API 170 and corresponding operations for providing a unified multilayer-based index for a contextual geoanalytics engine in a data analytics system. At block 10, access data from a plurality of data sources. At block 12, aggregate the data into data layers that correspond to data types of the data. At block 14, generate location embedding record comprising contextual data. At block 16, map the location embedding records to a unified multilayer-based index. At block 18, co-register data layers based on geohash identifiers. At block 20, provide access to the data layers via the geohash identifiers. At block 22, access a query for data stored in data layers and indexed using a unified multilayer-based index. At block 24, based on the query and the unified multilayer-based index access location embedding records. At block 26, communicate the location embedding records.

Exemplary Methods

Figure 3:
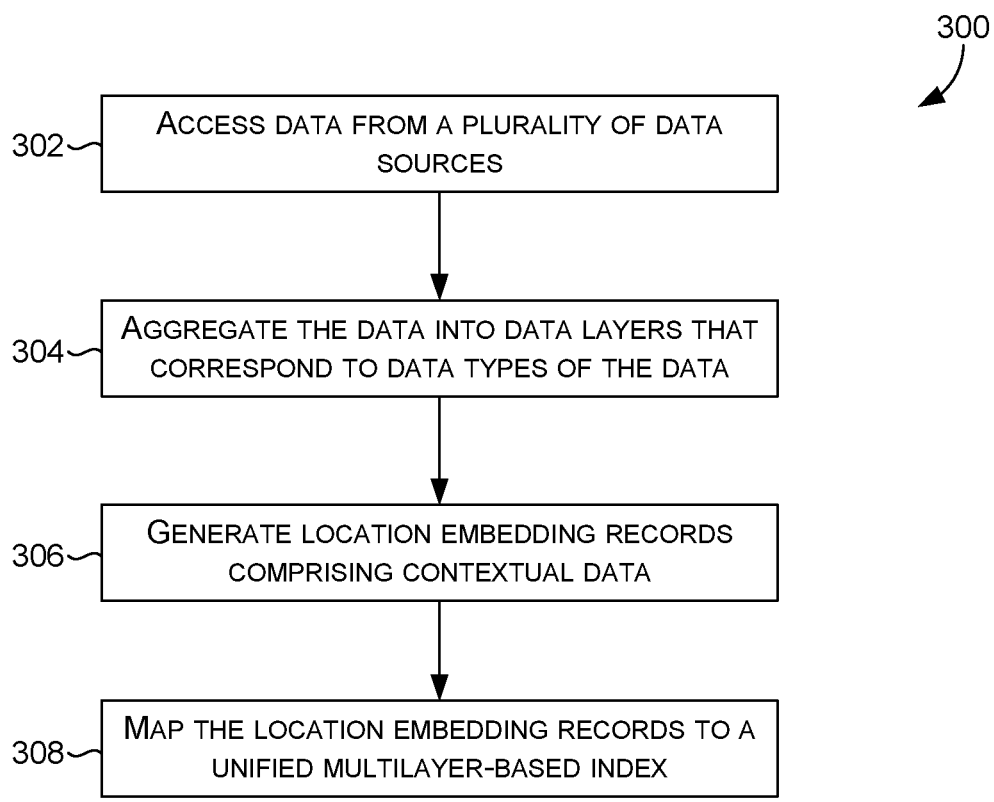
FIG. 3 is a flow diagram showing an exemplary method for implementing a data analytics system with a multilayer processing engine, in accordance with embodiments described herein.
Figure 4:
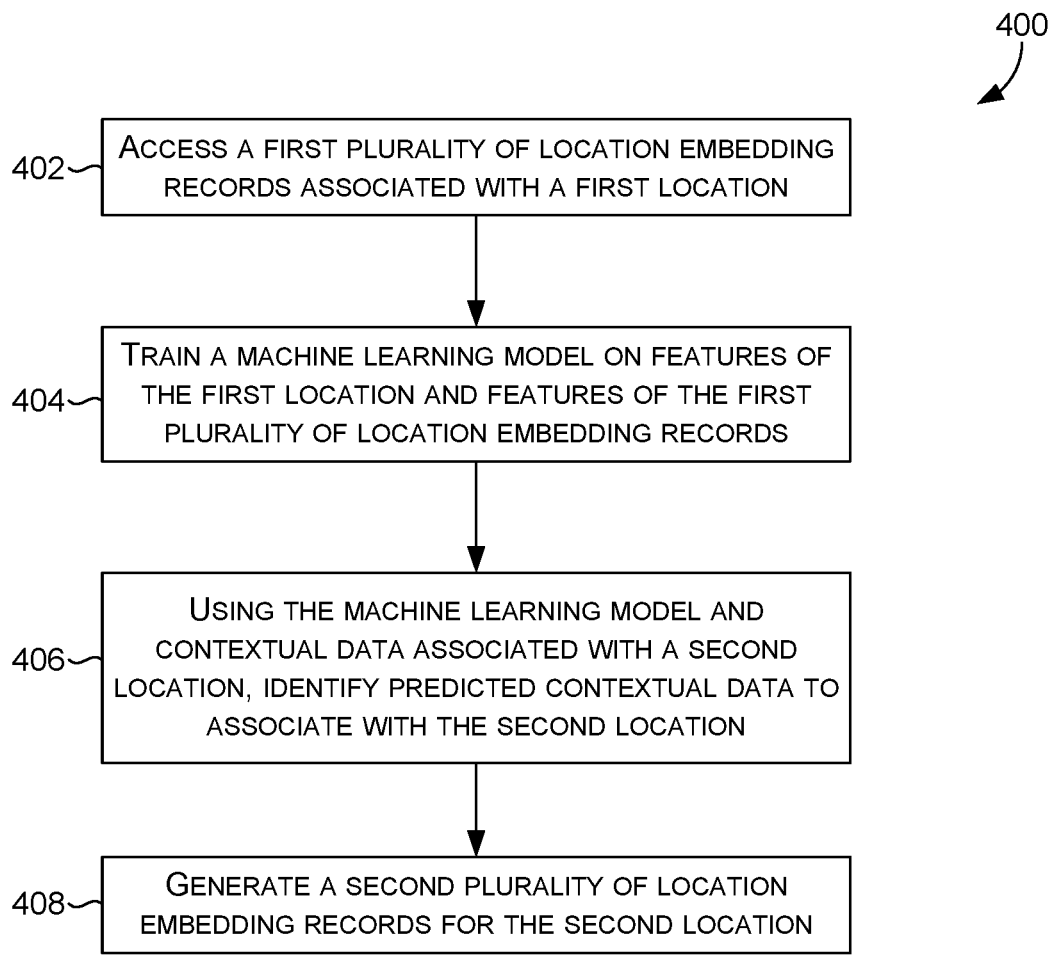
FIG. 4 is a flow diagram showing an exemplary method for implementing a data analytics system with a multilayer processing engine, in accordance with embodiments described herein.
Figure 5:
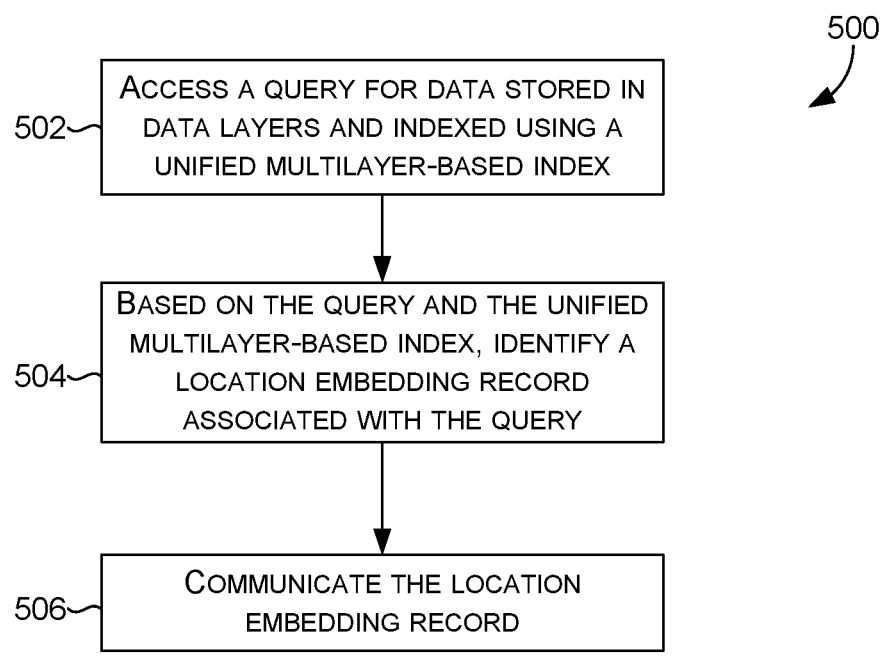
FIG. 5 is a flow diagram showing an exemplary method for implementing a data analytics system with a multilayer processing engine, in accordance with embodiments described herein.

With reference to FIGS. 3, 4 and 5, flow diagrams are provided illustrating methods for providing a unified multilayer-based index for a contextual geoanalytics engine in a data analytics system. The methods may be performed using the data analytics system described herein. In embodiments, one or more computer-storage media having computer-executable or computer-useable instructions embodied thereon that, when executed, by one or more processors can cause the one or more processors to perform the methods (e.g., computer-implemented method) in the virtualization system (e.g., a computerized system or computing system).

Turning to FIG. 3, a flow diagram is provided that illustrates a method 300 for providing a unified multilayer-based index for a contextual geoanalytics engine in a data analytics system. At block 302, access data from a plurality of data sources. At block 304, aggregate the data into data layers that correspond to data types of the data. At block 306, generate location embedding record comprising contextual data. At block 308, map the location embedding records to a unified multilayer-based index.

Turning to FIG. 4, a flow diagram is provided that illustrates a method 400 for providing a unified multilayer-based index for a contextual geoanalytics engine in a data analytics system. At block 402, access a first plurality of location embedding records associated with a first location. At block 404, train a machine learning model on features of the first location and features of the first plurality of location and features of the first plurality of location embedding records. At block 406, using the machine learning model and contextual data associated with a second location, identifying predicted contextual data to associate with the second location. At block 408, generate a second plurality of location embedding records for the second location.

Turning to FIG. 5, a flow diagram is provided that illustrates a method 500 for providing a unified multilayer-based index for a contextual geoanalytics engine in a data analytics system. At block 502, access a query for data stored in data layers and indexed using a unified multilayer-based index. At block 504, based on the query and the unified multilayer-based index, identify a location embedding record associated with the query. At block 506, communicate the location embedding record.

Example Distributed Computing System Environment

Figure 6:
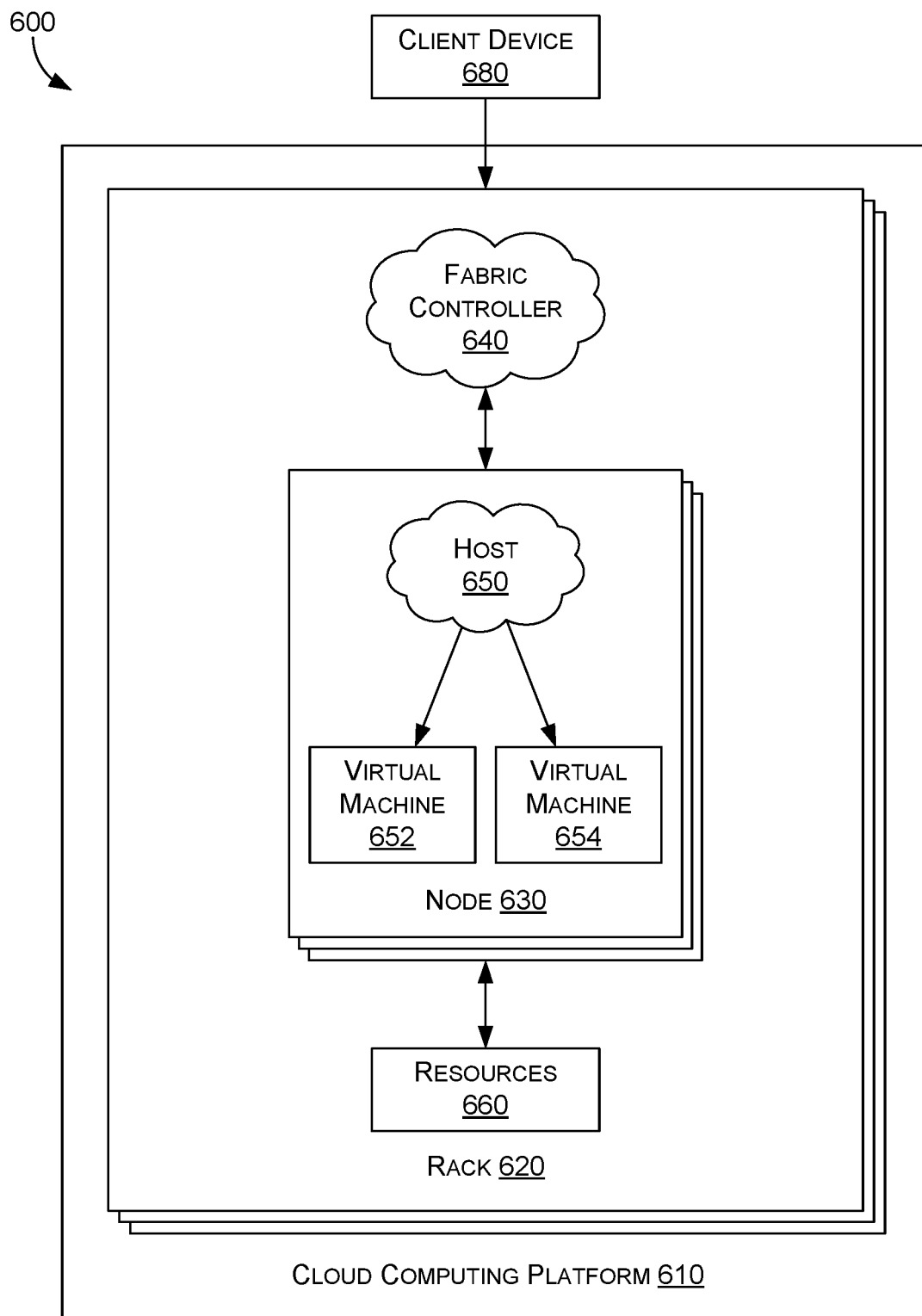
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
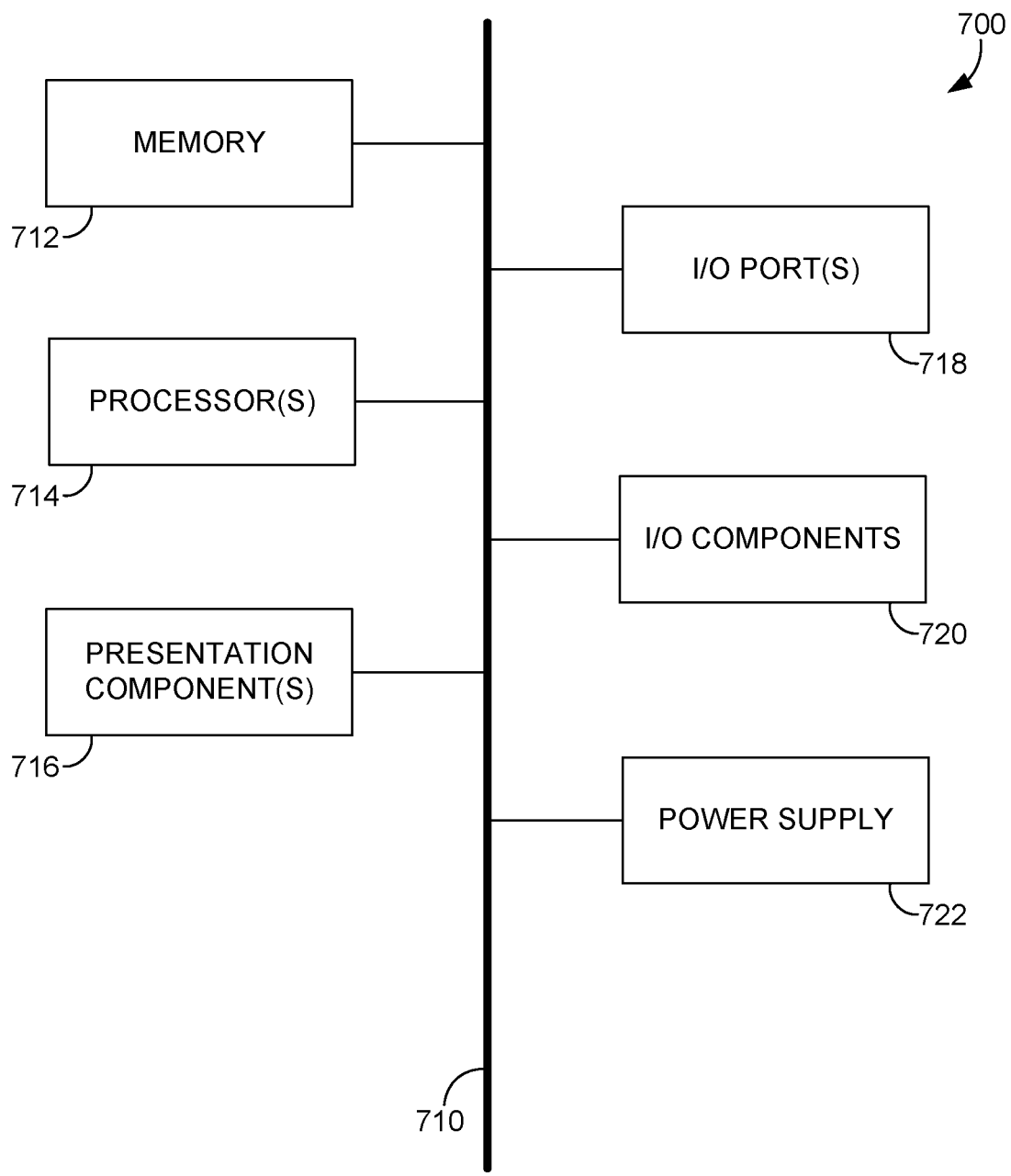
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing, at a contextual geoanalytics engine, data from a plurality of data sources;
aggregating the data into data layers that correspond to data types of the data, wherein the data layers are stored in a data store;
generating, using a machine learning model comprising one or more neural networks, location embedding records as a homogenous representation of the data, wherein each of the location embedding records comprises contextual information regarding a respective location,
wherein the machine learning model is trained to identify the contextual information based on vector representations of the data, and
wherein each of the vector representations is associated with at least one of a respective point-of-interest or a respective location, and
wherein at least some of the location embedding records are associated with two or more data types, wherein the location embedding records are generated based on point-of-interest data of the data;
mapping the location embedding records to a unified multilayer-based index, wherein the unified multilayer-based index provides access to the location embedding records associated with the data types of the data that are stored in different data layers;
providing an Application Programming Interface (API) that exposes the unified multilayer-based index;
receiving, from a client device via the API, a query for requested data stored in data layers and indexed using the unified multilayer-based index;
based on the query and the unified multilayer-based index, accessing a location embedding record associated the requested data; and
communicating, to the client device via the API, the location embedding record in response to the query.

2. The system of claim 1, wherein the contextual geoanalytics engine supports each of the following:
export, transport, and load (ETL) operations for aggregating statistics as hierarchical and granular data; and
merging datasets based on the data layers and the unified multilayer-based index operating as a shared common index for the data layers.

3. The system of claim 1, wherein the unified multilayer-based index is a hierarchical spatial data structure associated with data having arbitrary precisions for corresponding geographical regions, wherein a first data entry of a first data layer is associated with a first precision and a second data entry of second data layer is associated with a second precision; and
wherein the first data entry and the second data entry are associated with a point-of-interest of the location embedding record, the first data entry and the second data entry are accessible via different data layers associated with the location embedding records.

4. The system of claim 1, wherein a first location embedding record represents a data entry of the data in a smaller dimensional space represented by a smaller cell of geographical region, wherein the data entry was originally associated with a larger dimensional space represented by a larger cell of the geographical region.

5. The system of claim 1, wherein each data layer is stored in a data table that is associated corresponding location embedding records, wherein each data layer is indexed by a geohash identifier or a shared geohash identifier.

6. The system of claim 1, further comprising co-registering data layers to a shared geohash identifier, wherein the co-registered data layers represent the data in different data types, wherein the data layers are queried simultaneously based on the shared geohash identifier.

7. The system of claim 1, wherein communicating the location embedding record further comprises accessing data associated with the location embedding record; and
communicating the data associated with the location embedding record as the requested data.

8. The computerized system of claim 1, wherein the machine learning model is trained to identify the contextual information, at least in part, by:
accessing the vector representations,
determining a plurality of attributes associated with at least one of a respective point-of-interest or a respective location,
determining a weighting for the plurality of attributes, and
determining the contextual information based on the weighting.

9. The computerized system of claim 1, wherein the machine learning model is trained to:

generate, based on the vector representations, a first location embedding record associated with a first location, and generate, based on the first location embedding record, a second location embedding record associated with a second location different from the first location.

10. The computerized system of claim 1, wherein the machine learning model is trained to:

generate, based on the vector representations, a first location embedding record associated with a first geographically-based level of granularity, and generate, based on the vector representations, a second location embedding record associated with a second geographically-based level of granularity different from the first geographically-based level of granularity.

11. One or more computer-storage media having computer-executable instructions embodied thereon that, when executed by a computing system having a processor and memory, cause the processor to perform operations comprising:

accessing, at a contextual geoanalytics engine, data from a plurality of data sources;

aggregating the data into data layers that correspond to data types of the data, wherein the data layers are stored in a data store;

generating, using a machine learning model comprising one or more neural networks, location embedding records as a homogenous representation of the data, wherein each of the location embedding records comprises contextual information regarding a respective location, wherein the machine learning model is trained to identify the contextual information based on vector representations of the data, and wherein each of the vector representations is associated with at least one of a respective point-of-interest or a respective location, and wherein at least some of the location embedding records are associated with two or more data types, wherein the location embedding records are generated based on point-of-interest data of the data;

mapping the location embedding records to a unified multilayer-based index, wherein the unified multilayer-based index provides access to the location embedding records associated with the data types of the data that are stored in different data layers;

providing an Application Programming Interface (API) that exposes the unified multilayer-based index;

receiving, from a client device via the API, a query for requested data stored in data layers and indexed using the unified multilayer-based index;

based on the query and the unified multilayer-based index, accessing a location embedding record associated the requested data; and communicating, to the client device via the API, the location embedding record in response to the query.

12. The one or more computer-storage media of claim 11, wherein the contextual geoanalytics engine supports each of the following:

export, transport, and load (ETL) operations for aggregating statistics as hierarchical and granular data; and merging datasets based on the data layers and the unified multilayer-based index operating as a shared common index for the data layers.

13. The one or more computer-storage media of claim 11, wherein the unified multilayer-based index is a hierarchical spatial data structure associated with data having arbitrary precisions for corresponding geographical regions, wherein a first data entry of a first data layer is associated with a first precision and a second data entry of a second data layer is associated with a second precision; and wherein the first data entry and the second data entry are associated with a point-of-interest of the location embedding record, the first data entry and the second data entry are accessible via different data layers associated with the location embedding records.

14. The one or more computer-storage media of claim 11, wherein a first location embedding record represents a data entry of the data in a smaller dimensional space represented by a smaller cell of geographical region, wherein the data entry was originally associated with a larger dimensional space represented by a larger cell of the geographical region.

15. The one or more computer-storage media of claim 11, wherein each data layer is stored in a data table that is associated corresponding location embedding records, wherein each data layer is indexed by a geohash identifier or a shared geohash identifier.

16. The one or more computer-storage media of claim 11, further comprising co-registering data layers to a shared geohash identifier, wherein the co-registered data layers represent the data in different data types, wherein the data layers are queried simultaneously based on the shared geohash identifier.

17. The one or more computer-storage media of claim 11, wherein communicating the location embedding record further comprises accessing data associated with the location embedding record; and communicating the data associated with the location embedding record as the requested.

18. A method comprising:

accessing, at a contextual geoanalytics engine, data from a plurality of data sources;

aggregating the data into data layers that correspond to data types of the data, wherein the data layers are stored in a data store;

generating, using a machine learning model comprising one or more neural networks, location embedding records as a homogenous representation of the data, wherein each of the location embedding records comprises contextual information regarding a respective location, wherein the machine learning model is trained to identify the contextual information based on vector representations of the data, and wherein each of the vector representations is associated with at least one of a respective point-of-interest or a respective location, and wherein at least some of the location embedding records are associated with two or more data types, wherein the location embedding records are generated based on point-of-interest data of the data;

mapping the location embedding records to a unified multilayer-based index, wherein the unified multilayer-based index provides access to the location embedding records associated with the data types of the data that are stored in different data layers;

providing an Application Programming Interface (API) that exposes the unified multilayer-based index;

receiving, from a client device via the API, a query for requested data stored in data layers and indexed using the unified multilayer-based index;

based on the query and the unified multilayer-based index, accessing a location embedding record associated the requested data; and communicating, to the client device via the API, the location embedding record in response to the query.

\* \* \* \* \*